Inventor
William P. Lawson
By Mann, Brown and McWilliams
Attys.

United States Patent Office 3,446,159
Patented May 27, 1969

3,446,159
CABLE CART ARRANGEMENT
William P. Lawson, Hammond, Ind., assignor to Ogden Engineering Corporation, a corporation of Indiana
Filed Sept. 27, 1967, Ser. No. 671,010
Int. Cl. B61b 5/00; H02g 11/00, 1/00
U.S. Cl. 104—178
19 Claims

ABSTRACT OF THE DISCLOSURE

The invention relates to a cart arrangement for supporting in an orderly manner connectors such as cables, hoses, and the like that extend or connect to a piece of movable equipment, such as a trolley or movable bridge mounted welding equipment for supplying the welding equipment with electricity, gas, etc. The cart is in the form of an open centered wheeled frame riding on an open centered trackway that parallels the path of movement of the equipment being serviced, which frame has journalled at each end thereof a free wheeling pulley. The various connectors are divided into two banks from a stationary attachment entry station adjacent one side of the cart. One of the banks is brought in a half loop around one of the cart end pulleys while the other bank is similarly applied to the other end pulley, with the banks being brought together on the other side of the cart and applied to an attachment secured to the movable equipment, from which they extend or are connected to the parts being serviced. The connectors of each bank in several embodiments are secured together in ribbon form with all of the cables, hoses, etc. disposed in approximate alignment transversely of the cart. The cart frame and connector attachments are arranged so that the lengths of the connector banks extending between the cart frame end pulleys are maintained in substantial parallelism. Several alternate ways of arranging the cart, training the connector banks, and ribboning the connectors together are disclosed.

This invention is concerned with arrangements for handling flexible connectors such as hoses, cables and the like that supply moving pieces of equipment such as trolley or bridge mounted equipment and, more particularly, to a floating cart arrangement and manner of applying the connectors thereto that suitably shifts position relationship as the position of the movable equipment is shifted within its range of travel to perform its work and which maintains the connectors in an orderly manner, while permitting permanent connection of the connectors between the equipment they service and appropriate stationary sources of supply.

Presently available apparatus of the general type indicated requires the use of a heavy, space occupying widthwise and heightwise, complex chain type cable carrier that is not only expensive, but also inconvenient and costly to add, subtract, or change as to cable sequence, that involves numerous joints that are a source of friction and require considerable maintenance such as greasing. This chain type cable carrier moves its supporting cart; bends the cables around the cart end; prevents different feed rates from resulting for different diameter cables by keeping the cable centers at the same bend radius; offers some protection against impact to the cable portions on top of the cart; and offers some protection for the cable portions going around the cart ends.

A principal object of this invention is to provide a cable cart arrangement of the general type indicated in which the chain type cable carrier of presently available apparatus is eliminated along with its inherent disadvantages but in which its worthwhile functions are still achieved.

Presently available apparatus of the general type indicated also requires the use of heavy, expensive, large diameter, fixedly combined end pulley type support rollers and track wheels. The combining of the track wheels and support rollers dictates the track elevation relative to the cart frame as well as requiring a pair of track wheels for each support roller and vice versa whether needed otherwise or not.

Another principal object of this invention is to provide a cable cart arrangement of the general type indicated in which cost and weight (hence resistance to movement) due to this combination support roller-track wheels arrangement are reduced while at the same time making the track elevation relative to the cart frame entirely optional to accommodate specific situations and having only as many wheels and as many rollers as needed for their separate and different functions instead of a fixed ratio.

Presently available apparatus of the general type indicated also use geometrical relations in pulling the cart which result in increasing tensions (assuming no slack in the pull cable involved) as the cart moves from its center of travel due to use in the pull cable of a half loop sloped to the attachment points, or results in slack take up, if slack is provided, before proper cart movement occurs, or requires extra cart length to minimize the amount of tension involved; also involved are radial geometrical relations in track wheel-end pulley-pull cable arrangements which result in slippage between track wheels and track and/or slippage between the end roller and the wire rope half loop frequently trained around one of the end rollers.

Another object of this invention is to provide a cable cart arrangement of the general type indicated in which tensions do not increase, nor is slack provision or extra cart length required, with cart movement away from its travel center and in which slippages do not occur.

Other important objects of this invention are to provide a cable cart and connector training arrangement therefor that are economical of manufacture, convenient to install, long lived and efficient in use, and applicable to a wide variety of applications.

Other objects, use, and advantages will be obvious or become apparent from a consideration of the following detailed description and the application drawings in which like reference numerals indicate like parts throughout the several views.

However, it is to be distinctly understood that the specific drawing illustrations provided are supplied primarily to comply with the requirements of the Patent Code and that the invention may have other embodiments that are intended to be covered by the appended claims.

General Description

Figures 1, 1A:
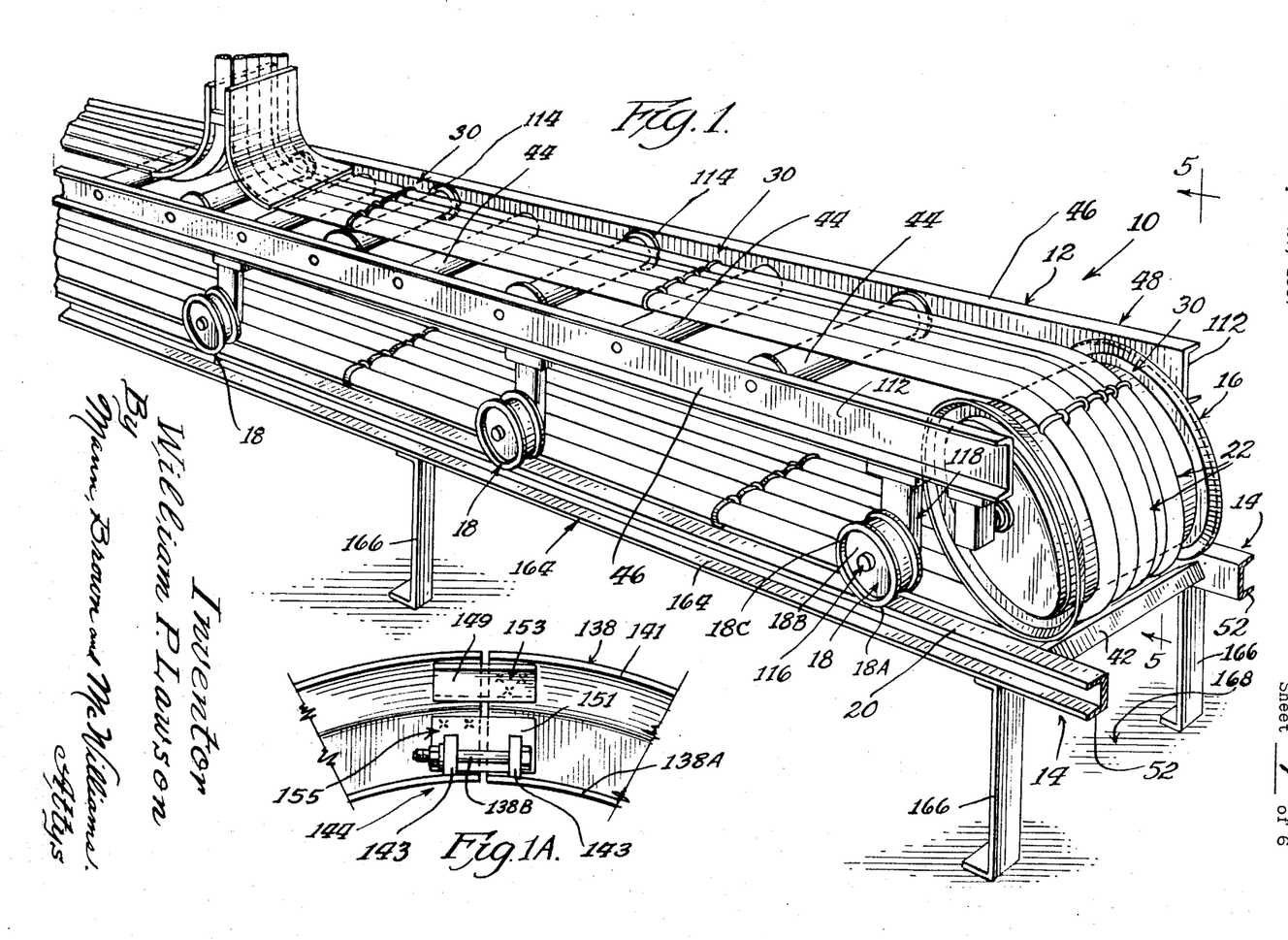
FIGURE 1 is a diagrammatic perspective view illustrating the major portion of a specific embodiment of the invention on an enlarged scale.
FIGURE 1A is a fragmental view illustrating one manner in which the end pulley flanges of the cart can be made adjustable.
Figures 2A, 2B, 3, 4, 4A:
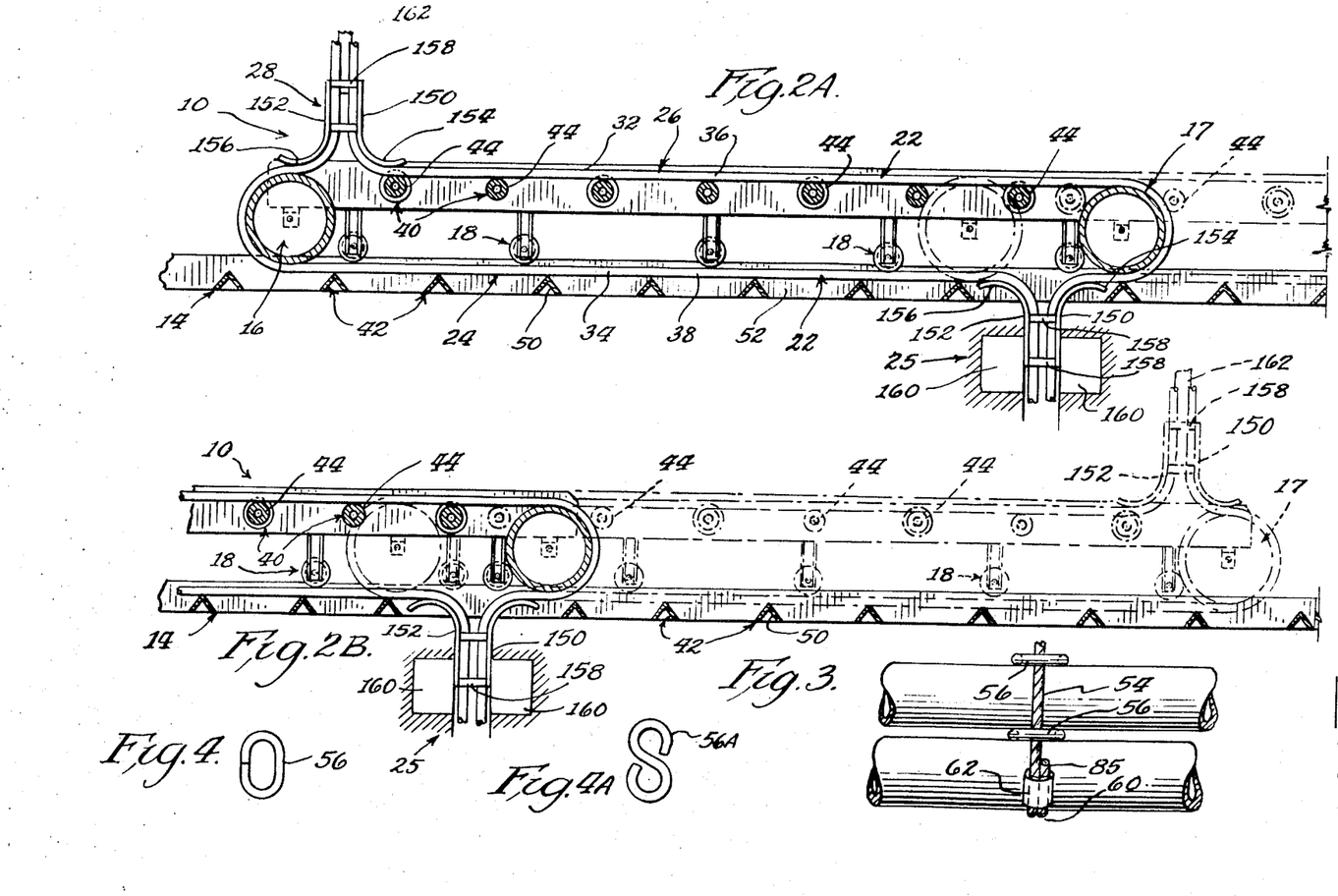
FIGURES 2A and 2B are a composite view taken along the longitudinal center line of FIGURE 1 illustrating on a somewhat smaller scale the basic arrangement of the cart and trackway therefor and showing in full line and broken line positions the range of movement of the cart in relation to the range of movement of the piece of equipment that is serviced by the connectors that are handled by the cart.
FIGURE 3 is a fragmental plan view illustrating one way that the connectors of each connector bank are ribboned together in accordance with this invention.
FIGURE 4 is a plan view of an eye or link that is employed in the arrangement of FIGURES 1–3.
FIGURE 4A is a plan view illustrating a modified form of eye or link that may be employed for the same purpose.

Reference numeral 10 of FIGURES 1, 2A and 2B generally indicates one embodiment of the invention which has been devised specifically to handle cables and hoses that supply electricity, gas and the like to welding heads that are mounted on a movable frame arranged to adjust the heads with respect to the work.

As an illustration of the applicability of this invention to a specific situation, in the fabrication of large I beams and the like, it has become frequent practice to mount a rolling frame that rides on the parts being welded, or on a separate trackway between the rails of which or alongside of which the parts are disposed, which frame carries the welding heads that are to be moved along the plate joint to be welded. The welding current for the welding heads as well as gas and the like that may be used in connection with the welding arc are usually supplied through cables and hoses that take their supply from a stationary source which, in the case of the welding current, is the conventional welding machine.

One commonly experienced problem in connection with apparatus of this type is that the moving frame which carries the welding heads ordinarily must be free to move a substantial distance, and thus the connecting cables and hoses must be correspondingly long to accommodate the desired range of movement. It has been difficult to keep the resulting long cables and hoses from becoming entangled during the course of the work as the welding head frame moves about and the cables are dragged back and forth. Usually, the cables and hoses are allowed to lie on the floor of the working space (where they are subject to mechanical damage) and consequently become entangled after a short period requiring repeated straightening out (which often subjects them to overlie small bend radii). Also, dragging the cables results in abrasive wear and gives considerable as well as variable resistance to movement of the welding heads and manual aid is frequently required to drag the cables.

The apparatus 10 is intended to keep the cables and hoses straightened out; use cables and hoses of minimum length; provide a minimum resistance to movement; provide a uniform resistance to movement; protect the cables and hoses from damage; avoid unduly small bend radii; eliminate abrasive dragging wear; eliminate manual aid for cable movement; and yet provide adequate maneuvering distance for the wheeled frame that carries the welding heads.

In accordance with this invention, the apparatus 10 comprises a wheeled cart 12 mounted on a trackway 14 and having journalled at either end free wheeling pulleys 16 and 17 with free wheeling support rollers 44 journalled between the two end pulleys. The cart 12 is provided with wheels 18 that are separate from both the end pulleys and support rollers and which ride on rails 20 that form the trackway 14.

The connectors indicated at 22 comprise a plurality of hoses and cables that extend from a suitable stationary attachment device located approximately at the mid point of the path of travel of the cart 12 and from which they also extend to or are connected to suitable sources of supply for welding current, gas, etc. Connectors 22, in accordance with this invention, are arranged into two groups or banks 24 and 26 (see FIGURE 2) which diverge at the stationary connector device 25 and are respectively trained about the respective end pulleys 16 and 17 in half loop form for rejoining by an attachment device 28 that is connected to the movable frame that carries the welding heads for movement therewith.

As indicated in FIGURE 1, the separate connectors of banks or groups 24 and 26 of connectors 22 are preferably, though not necessarily, laced together by lacing arrangements 30 that secure the respective connectors of each bank together in ribbon form, with the portions 32 and 34 (see FIGURE 2A) of the respective banks that extend between the attachment devices 25 and 28 being completely and permanently free of entanglement. It will be noted that the cart 12 is proportioned and the attachment devices are so arranged that the lengths 36 and 38 of the connectors 22 that extend between the respective attachment devices 28 and 25 and end pulleys 16 and 17 are in substantial parallelism longitudinally of the cart, and, to this end, the connector portions 32 and 34 are applied between the attachment devices 25 and 28 with adequate tension to maintain a firm training relationship with respect to end pulleys 17 and 16 (for certain conditions, the sideways locating action of this tension may be sufficient so that lacing devices 30 are not necessary for this purpose), and the connector lengths 36 and 38 are respectively supported by transversely extending spaced apart members 40 (see FIGURE 2B) and 42 (see FIGURE 2A) of the cart and trackway, respectively. Members 40 have their upper or connector supporting portions respectively tangent to a plane that is tangent with and extends between the upper peripheral portions of the end pulleys that the connectors engage. Members 42 have their upper or connector supporting portions tangent to a plane that is a suitable clearance distance for the supported cables from and parallel to a plane that is tangent with the lower peripheral portions of the end pulleys. The members 40 in the form shown are preferably small diameter rollers 44 journalled for free wheeling rotation between the side members 46 of the cart frame 48 and preferably the side members extend upward past the connector tops to afford protection from falling bars and the like. The members 42 illustrated are in the form of angle members 50 (see FIGURE 2A) arranged to have their apexes pointed upwardly to be self cleaning and are secured between the channel member 52 that form the rails 20 of trackway 14. Members 42 may also be in the form of solid or tubular bars similarly shaped and oriented or they may be round bars or tubes of a similar nature; they may also be part of a separate stationary structure where the track and the cart supporting wheels are located at some other elevation, as for instance, above the cart.

Figures 5, 6, 7:
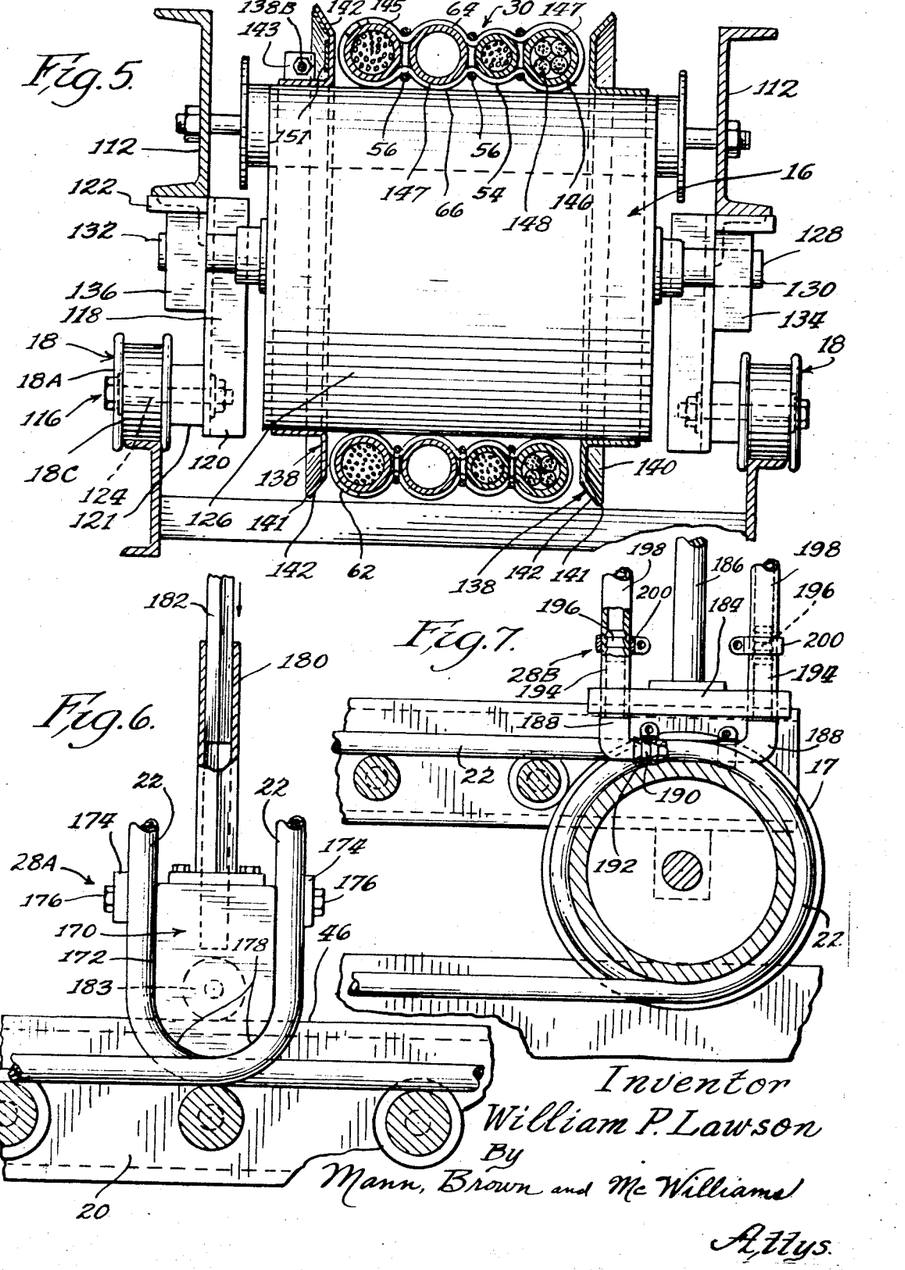
FIGURE 5 is a transverse cross-sectional view substantially along line 5—5 of FIGURE 1, with parts being shown in elevation to better bring out the structural relation involved.
FIGURE 6 is a fragmental elevational view, partially in section, and illustrating an alternate connector attachment arrangement that permits an increase in cart travel over that shown in FIGURES 2A and 2B without tension change, and that is also arranged to permit the cart to float vertically with respect to the equipment being serviced.
FIGURE 7 is a view similar to that of FIGURE 6 but illustrating a further modified form of connector attachment arrangement that is especially adapted for use in connection with hoses.

The lacing devices 30 are applied to the connector devices of each bank in the spaced apart relation necessary to keep the connectors of each bank in essentially ribbon form, and each device 30 comprises a length of suitable cordage such as the nylon cord 54 of FIGURE 3, which is doubled over the bank of connectors transversely thereof and passed through the separate eyes 56 that are interposed between adjacent connectors and has its ends 85 and 60 joined together by a suitable banding device 62 such as a crimped copper tube. As indicated in FIGURE 5, the cord 54 should be drawn sufficiently tight so that the individual adjacent cables and hoses are drawn toward each other and are securely and closely adjacent the intervening eyes 56. Although the eyes are shown as thin, they can be tubular sections, as for instance, short conduit lengths, when it is desired to space the connectors more than a minimum distance apart. The eyes 56, in cooperation with the upper and lower cord lengths 64 and 66, effect a centering action on the connectors 22 involved which tends to maintain them in horizontal alignment transversely of the cart 12, with the result that the neutral axes of the connectors all make the same radius about the respective end pulleys 16 and 17 as the portions of the connectors that happen to be in engagement with and are thus arced about those pulleys thus causing both small and large diameter connectors 22 to feed equal footage around the end pulleys. By disposing the two same diameter largest connectors at the outside edges of each bank, the centers of the smaller connectors are automatically similarly positioned even though they may be spaced from the end pulley (see FIGURE 5).

As the welding equipment is moved along its path of movement with the drawing force on the connector portions 32 and 34 applied in substantial alignment with their neutral axes, the respective connectors are fed lengthwise of their neutral axes over the pulleys 17 and 16 without any binding or connector stretching occurring. The small diameter rollers 44 that the connector lengths 36 cooperate with afford little resistance to this movement due to the relatively small mass of the rollers and connector lengths producing only a small bearing loading. Also, the rotational separation of the support rollers 44 and the cart wheels 18 permits the r.p.m.'s, diameters, and axes of rotation of the rollers and wheels to be independent of each other. Since, as a result of this independence, the support rollers and track wheels are no longer compelled to have the large diameter dictated by the large diameter combined end pulley-track wheels of presently available apparatus for its combined support roller-track wheels, the track wheels and support rollers of the cart of the present invention are preferably no larger than necessary to properly perform their different separate functions and will usually be diameters that are small compared to that of the end pulleys. This achieves a considerable reduction in cost and weight compared to presently available apparatus without a loss in performance. Also, as indicated in FIGURES 1–2B, wheels 18 may be significantly less in number than the number of support rollers 44. Furthermore, since the end pulleys 16 and 17 are both free to rotate independently of the cart supporting wheels 18, the contact of the track wheels with the trackway 14 does not introduce any dragging effect on the desired movement of the cart 12 by either of these end pulleys. Since the connector lengths 38 lie stationary with respect to the trackway until taken over one of the end pulleys, they introduce no drag on the movement of the cart.

The cart 12 is thus essentially free floating on its trackway and, due to low total weight, offers only nominal inertial resistance to changing movement of the movable frame carrying the welding heads. It has also been found that the parallel relationship indicated for connector lengths 36 and 38 insures that the cart 12 may be of minimum length for any particular range of travel desired, without the development of tension, let alone excessive tension, nor do the cables and hoses need to be extensible or have slack provided in order to move the attachment 28 from a centered or aligned position with respect to the attachment device 25. The arrangement of cart 12 also permits the movable frame that carries the welding head to have a range of movement that is twice that of cart 12.

A most important aspect of this invention is that the conventional expensive chain type carrier is completely eliminated, and the drawing action of the attachment device 28 under movement of the welding equipment being serviced is applied directly to the cables and hoses themselves, or alternately, to a light inexpensive wire rope half loop or loops under conditions requiring same (as where all the connectors are readily collapsible), which rope is a connector within the meaning of the appended claims.

The embodiment of FIGURE 6 shows an attachment device 28a which permits a vertical floating action between the cart and the apparatus being serviced. Attachment device 28A also illustrates a cable and hose take off arrangement which permits the attachment device 28A and its corresponding fixed attachment device (not shown but identical to device 28A except for float) that is comparable to that shown at 25 in FIGURE 2A to be positioned in alignment with the respective axes of rotation of the cart end pulleys 16 and 17 for achieving maximum travel of the cart.

The embodiment of FIGURE 7 discloses an attachment arrangement 28B that also provides for maximum travel of the cart and is especially adapted for application to connectors 22 that are in the form of hoses.

Figures 8, 9, 10, 11:
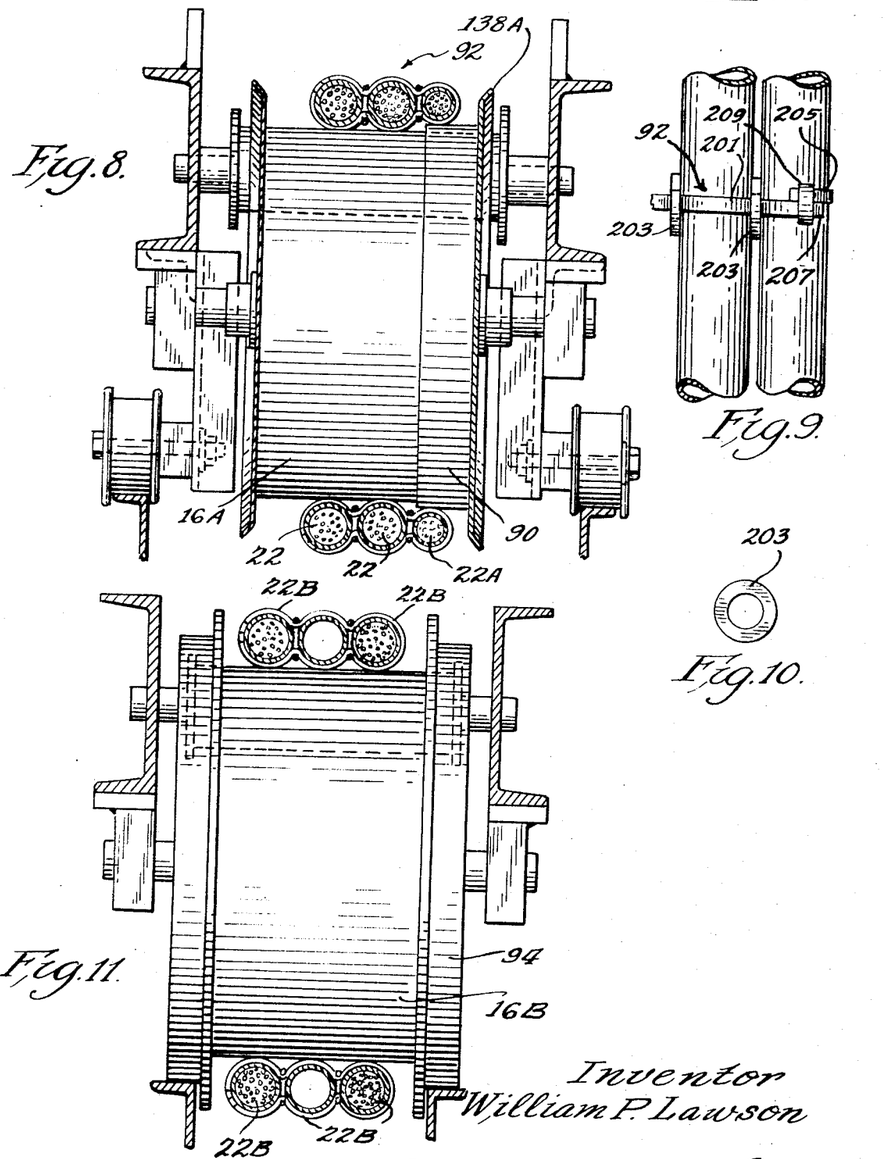
FIGURE 8 is a view similar to that of FIGURE 5 illustrating a modified arrangement of the cart and connector bank ribboning arrangement.
FIGURE 9 is a view similar to that of FIGURE 3 illustrating the ribboning arrangement employed in the embodiment of FIGURE 8.
FIGURE 10 is a view similar to that of FIGURE 4 illustrating the washer type eye that is employed in the arrangement of FIGURE 9.
FIGURES 11, 12, 13 and 14 are views similar to that of FIGURE 5 illustrating further modified cart and connector training arrangements.

In the embodiment of FIGURE 8, the end pulleys, here illustrated by end pulley 16A, are of special configuration to dispose a smaller cable or connector 22A that is disposed at the outside of the particular connector bank in question in alignment with the neutral axes of the adjacent larger connectors 22. For this purpose, the pulley 16A is of stepped diameter configuration to define an enlarged portion 90 of suitable external diameter to effect this purpose. Where it is desired to dispense with lacing, several diameter steps, each step with flanged sides, can be provided in the pulleys to place all the cables with their centers at the same level while going around the end pulleys.

FIGURES 9 and 10 illustrate the specifics of an alternate lacing arrangement 92 that is shown in FIGURE 8.

FIGURE 11 illustrates an embodiment in which the end pulleys are arranged to serve as the outermost wheels for the cart, with the intermediate track wheels still being separate from the support rollers. For this purpose, the end pulleys, such as the illustrated end pulley 16B, are formed at either end thereof with an extension 94 that is struck on a radius which is the same as that the neutral axes of the connectors 22B have with regard to the portions thereof that engage the pulleys. This arrangement together with the in-line application of tension forces to the connectors 22B by attachment devices 25 and 28 and the substantial parallelism of the connector lengths 36 and 38 will insure that there will be no slippage between the connectors and the pulleys or between the wheel extensions of the pulleys and the track and that there will be no tension increase due to moving the cart to either side of its median position.

Figure 12:
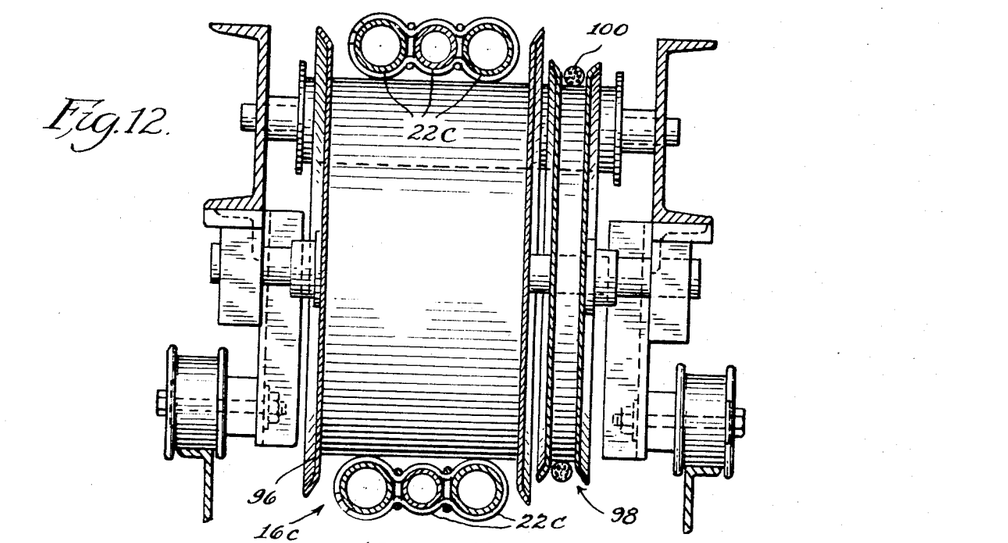

In the embodiment of FIGURE 12, it is assumed that the connectors 22C are of the type (for instance hoses that may be soft walled) that are too weak to have cart pulling tension applied to them without collapsing at the cart end pulleys, and, to accommodate such situations, the end pulleys, such as pulley 16C, are of the separately bearinged multiple sheave type comprising as sheave portion 96 about which the connectors 22C are trained and a sheave portion 98 about which a length of wire cordage 100 or small chain (pulling-not cable carrying) is trained. In this embodiment of the invention, both of the cart end pulleys are made the same as pulley 16C shown in FIGURE 12 and the wire cordage 100 that is applied to each constitutes a connector for drive supplying purposes and is applied as shown in FIGURES 1–2B and has its ends attached to the attachment devices 25 and 28 to define two more wire rope half loops. Whichever wire rope (cordage) half loop is trailing the moving attachment is driven or moved by the movable attachment 28 to move the cart. The cart is driven both directions by the then trailing wire rope half loop. The full loop of connectors is driven both directions by the cart, and, although the half loops of connectors are attached together, this attachment would not have to be attached to movable attachment 28 except for convenience since the cart will cause their joining point to stay aligned with the movable attachment 28. Wire rope can also be used on an end pulley contour as in FIGURE 8 as well as on a separate sheave as in FIGURE 13.

Figure 13:
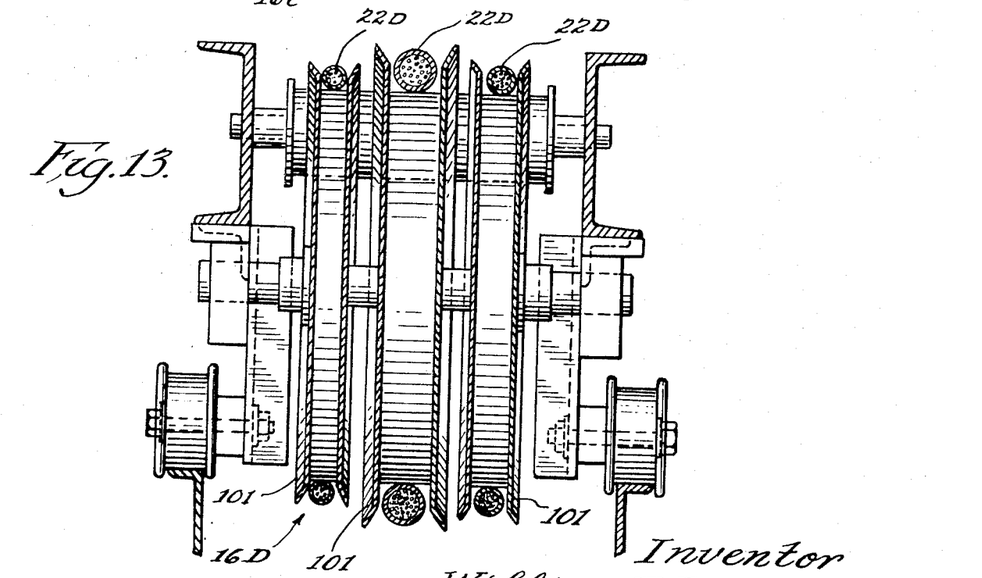

In the embodiment of FIGURE 13, the end pulleys, such as end pulley 16D, are again of a separately free wheeling multiple sheave type in which each of the connectors 22D has its own sheave 101. This arrangement is particularly useful when the two largest connectors are of different diameters so that ribboning the connectors of each bank together will not achieve the neutral axis alignment and parallelity to the end pulley axis that is indicated in FIGURE 5. The embodiment of FIGURE 13 provides for separate training of each connector which insures that it will be properly associated with its end pulley sheaving portion for proper operation in accordance with this invention. Ribboning is not possible with this embodiment of the invention due to the different r.p.m.'s of the sheaves.

Figures 14, 15:
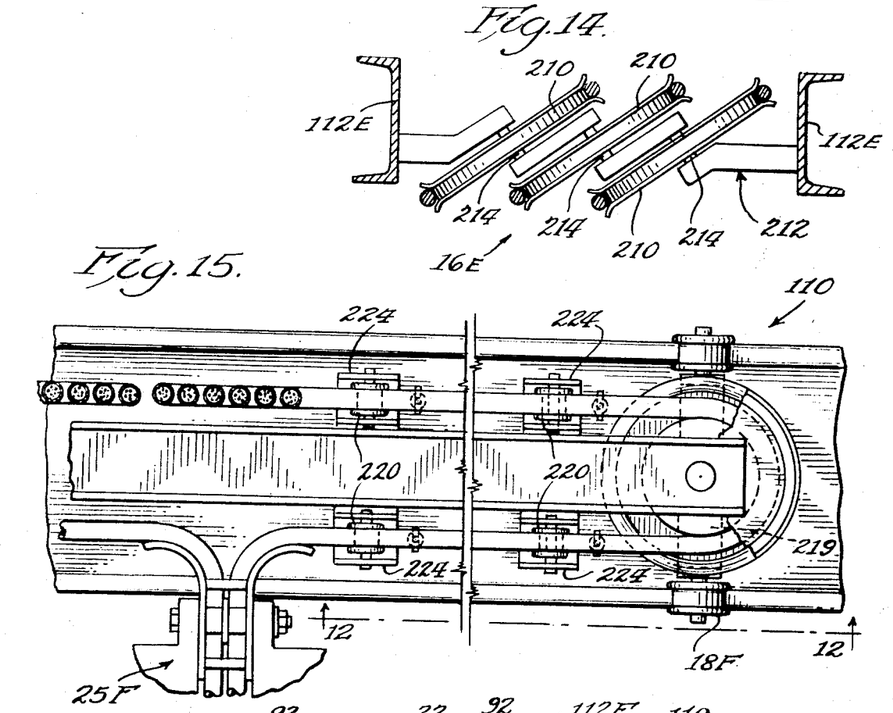
FIGURE 15 is a plan view of one end of yet a further modified form of cart arrangement.

In the embodiment of the invention shown in FIGURE 14, the end pulleys, such as end pulley 16E, are again of the separately free wheeling multiple sheave arrangement but, in this embodiment of the invention, the sheaves are inclined with respect to the plane of the cart to achieve a cart frame of minimum overall height for use in vertically cramped places while maintaining a suitably large bend radius for the connectors.

Figure 16:
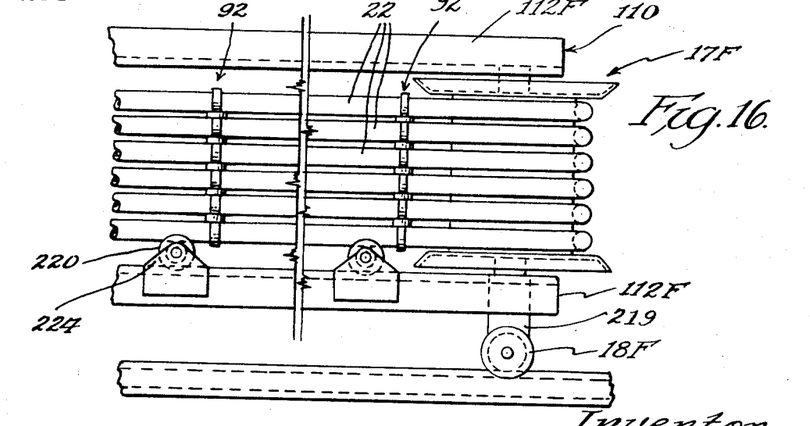
FIGURE 16 is a side elevational view of the cart arrangement shown in FIGURE 15.

In the cart arrangement of FIGURES 15 and 16, the cart 110 is arranged to be vertically disposed so that the cart end pulleys, such as end pulley 17F, have their axes vertically disposed. In this arrangement, the cart is especially adapted to work in spaces of minimum width.

*Specific description*

Returning now to the embodiment of FIGURES 1–5, the frame 48 of cart 12 comprises side members 46 in the form of a pair of channel shaped members 112 between which rollers 44 are journalled in any appropriate manner. As indicated in FIGURES 1, 2A and 2B, alternate rollers 44 may be flanged as at 114 to insure proper centering of the ribboned connectors 22 although in practice it has been found that the flanges 114 on rollers 44 usually are not required.

The wheels 18 of the cart 12 that is illustrated are journalled on the cart by being applied to pins 116 affixed to suitable vertical post structures 118 that are affixed to the respective channel members 112 in any suitable manner. As better indicated in FIGURE 5, the respective post structures 118 each comprise a channel shaped member 120 having affixed to the upper end thereof a plate 122 which is in turn secured to the adjacent cart frame member 112 in any appropriate manner as by welding, bolts, or the like.

The wheel pins 116 are in the form of bolts 124 that appropriately secure the respective wheels 18 in position against an abutment 121. Wheels 18, in the form shown, are ball bearing units 18A that include inner race forming member 18B and outer race member 18C separated by ball bearings (not shown) riding in a conventional manner in raceways of the inner and outer races. It is the inner race member 18B that is secured in place by bolt 124.

The end pulleys 16 and 17 are identical and, in the form shown, comprise a drum member 126 affixed to shaft 128 in any suitable manner, with the shaft 128 having its ends 130 and 132 journalled in appropriate bearing structures 134 and 136, respectively, which are respectively secured in any suitable manner to the undersides of cart frame members 112. The minimum diameter of drum 126 dictated by the bend radius to which the particular connectors can be repeatedly subjected.

In the form of FIGURES 1–5, the pulleys 16 and 17 are provided with adjustable flanges 138, that are in the form of split annular elements 140 having their outer peripheries 141 flared outwardly as at 142 and provided with a clamping device of the type indicated in FIGURE 1A at 144 for drawing the element 140 into clamping engagement with the drum 126. The flanges 138 may thus be adjusted axially of the respective drums 126 to accommodate ribboned connectors 22 of various widths depending on the installation. Device 144 comprises a pair of lugs 143 fixed to the flange rim portion 138A on either side of the split and connected together by a tensioning bolt 138B. Guides 149 and 151 fixed to the flange outside surface as at 153 and 155, respectively, on opposite sides of the split keep the adjacent split portions of the flange in alignment.

As indicated in FIGURE 5, the connectors 22 may be of various types and cables and hose are illustrated. In the case of the special connector indicated at 146 in FIGURE 5, that connector is made up of a number of smaller cables 148 wound in rope twist form and received within a flexible covering 147 and the parts may be proportioned to have a resulting size comparable to the illustrated cables 22 when it is desired to use special connector 146 at one edge of the ribbon of connectors.

The connector attachment device 25 (FIGURES 2A and 2B) is shown in the form of a pair of plate elements 150 and 152 having end portions 154 and 156 curved to accommodate a smooth arcing of the connectors from the attachment device 25. Plates 150 and 152 are separated by spacers 158 welded thereto which are formed with appropriate openings through which the individual connectors 22 pass and in which the connectors are clamped. In the case of the attachment device 25, it is intended that it be stationary with respect to the ground and, for this purpose, it is shown secured between two fixed abutments 160 which may be of any suitable type. However, the manner of fixing attachment device 25 or its equivalent in place against movement is largely optional and will depend upon the facilities available for a particular installation. In the form of the invention shown in FIGURES 1–5, the attachment device will be located underneath the trackway 14 and the connectors 22 may there be directly connected to a junction box or the like or proceed further distances to their respective sources of supply.

The attachment device 28 is similar to device 25 as indicated by corresponding reference numerals. The device 28 is preferably affixed in any suitable manner, such as by welding, to a carrying arm 162 that is secured to the frame that carries the equipment being serviced.

The trackway 14 is in the form of lengths of channel members 52 joined together by the transversely extending angle members 42 to form a frame 164. Adjacent frames 164 are joined together to dispose the channel members 52 thereof in longitudinal alignment to provide a trackway of any desired length suitable for a particular installation. The frames 164 are supported by suitable supporting legs 166 that preferably space the trackway 14 above the ground level 168 sufficiently so that slag, chips or other debris will drop through trackway 14 onto the floor or the like that constitutes level 168 and can be removed by a broom or the like. Angle members 42 are spaced frequently enough to support connectors 22 and are oriented so that their apexes are directed upwardly so that dropping slag is funnelled through the trackway making the area where the connectors lay to be self-cleaning.

In the attachment device 28A of FIGURE 6, the attachment device comprises a head structure 170 defining a U-shaped connector engaging surface 172 against which the individual connectors 22 that pass from the respective connectors banks pass onto for connection to the equipment being serviced. The individual connectors are secured in place by suitable clamping bars 174 held in place by bolts 176, and it will be noted that the connectors merge smoothly from the respective banks of connectors to association with the attachment device 28A in a smoothly rounded quarter circle curve or arc as at 178.

In the embodiment of FIGURE 6, the head structure 170 includes a tubular post 180 of polygonal transverse cross-sectional configuration (preferably square) which receives a bar element 182 of complementary cross-sectional configuration that is carried by the frame supporting the equipment being serviced. Bar 182 makes a sliding contact with tubular post 180, which accommodates what vertical variations there may be of the cart trackway from exact parallelism with respect to the trackway of the equipment being serviced.

Since the head 170 thus floats, it is provided with rollers 183 on either end thereof for riding on the cart side members 46 as rails to maintain the proper clearance relative to rollers 44.

In the embodiment of FIGURE 7, the attachment device 28B comprises a head structure 184 fixedly carried by a pull post 186 secured in any suitable manner to the frame carrying the welding equipment or the like. The head structure 184 carries a number of fittings 188 to which the ends of the connectors 22 may be connected. As this form of the invention is intended for use in connection with hoses, the connectors 22 of FIGURE 7 are illustrated as hoses and the elbow fittings 188 are provided with toothed extensions 190 over which the hose ends are applied and clamped in place by a suitable hose clamp 192, with the other ends of the fittings 188 being applied to the head 184 in alignment with fittings 194 that are formed with similar toothed extensions 196 for application to hoses 198 that proceed to the equipment being serviced. Hoses 198 are clamped to fittings 194 by suitable hose clamps 200.

In the embodiments of FIGURES 8-13, the cable cart and supporting trackway arrangement therefor are the same as described in connection with the showing of FIGURES 1-5 except for the variations shown in respect to FIGURES 8-13, although in the embodiment of FIGURES 8-10, the lacing device 92 is in the form of a length of plastic strapping 201 doubled over the bank of connectors transversely thereof and through washers 203 that are interposed between adjacent connectors and has its ends 205 and 207 joined together by a suitable binding device such as crimped band 209, in a manner similar to the arrangement of FIGURE 3. Also, the end pulley end flanges 138A where employed are fixedly mounted in their indicated positions.

In the embodiment of FIGURE 14, the end pulleys are illustrated by the depicted end pulley 16E which is in the form of separate sheaves 210 journalled on a special cross bar structure arrangement indicated at 212 in which the sheaves 210 are respectively journalled on shaft portions 214 that are inclined with respect to the horizontal at the angle indicated so that the individual sheaves 210 are in nested relation substantially within the vertical dimensioning of the cart frame side members 112E. This permits the cart arrangement of FIGURE 14 to be used in areas of restricted overhead while still having a suitably large bend radius for the connectors.

In the embodiment of FIGURES 15 and 16, the cart side members 112F are in vertical alignment and the end pulleys rotate about vertically disposed axes in the manner indicated in FIGURE 16. The cart wheels or rollers 18F are journalled on either end of a cross member 219 that is fixed in any suitable manner to the cart frame member 112F. The end pulleys such as the illustrated end pulleys 17F are journalled in place between the frame members 121F in any suitable manner.

The connectors 22 of the respective banks will thus be vertically disposed one above the other and the respective banks ride on rollers 220 of the respective roller devices 224 that are secured in any suitable manner on either side of the cart lower frame member 112F. The connectors 22 of this embodiment are preferably ribboned together, as by employing lacing devices 92 of FIGURE 9.

It will thus be observed that the connectors 22 of the embodiment of FIGURES 15 and 16 extend onto the cart of this embodiment from one side thereof and extend away from it from the other side thereof, rather than from below and above the cart, as in the other illustrated embodiments of the invention. The stationary attachment device may be similar to device 25, as indicated by reference numeral 25F, while the exit attachment device arrangement may be of any suitable type that fans out the connectors in a vertical plane in a manner suggested in FIGURE 15 for extension to the equipment being serviced in a manner to permit the cart arrangement of FIGURES 15 and 16 to operate in the minimum width confines indicated.

While an important aspect of this invention has been elimination of the need for a chain cable carrier, it would be possible to apply a cable carrying chain to the cart of this invention simply by substituting the chain and its carried cables for either or both of the banks 24 and 26 of connectors 22 of this invention thus improving on the presently available apparatus by incorporating the advantages of the cart of this invention over the type cart presently used with chain cable carriers (such cable carrying chain would then constitute a connector within the meaning of the appended claims).

The foregoing description and the drawings are given merely to explain and illustrate the invention and the invention is not to be limited thereto, except insofar as the appended claims are so limited, since those skilled in the art who have the disclosure before them will be able to make modifications and variations.

What is claimed is:

1. A cart arrangement for supporting in an orderly manner flexible elements such as cables, hoses, and the like comprising flexible connector means that extend from a stationary source to a movable apparatus which includes mechanisms to be supplied by the cables and hoses or the like, said cart arrangement comprising:

a wheeled elongate frame riding on an elongate trackway that extends substantially parallel to the path of movement of the movable apparatus, a free wheeling end pulley journalled on said frame adjacent each end thereof, said pulleys being journalled for rotation about substantially parallel axes, means on the flexible element entry side of said frame for anchoring the flexible connector means in a group in a stationary position relative to the trackway and at approximately half way between the ends of the trackway, means on the flexible element exit side of said frame for anchoring the flexible connector means in a group to the apparatus, with the flexible connector means portions intermediate said anchoring means being trained in half loop form over said end pulleys, with certain of said connector means engaging one of the end pulleys and the remainder of said connector means engaging the other of said end pulleys, said frame end pulleys being proportioned to dispose the lengths of said connector means that extend between the respective anchoring means and end pulleys in substantial parallelism longitudinally of said frame, said frame including spaced support means intermediate said end pulleys along said exit side thereof that are positioned to support the connector means lengths in said substantial parallelism, with said support means comprising free wheeling rollers having a diameter that is small as compared with the diameters of said end pulleys, said anchoring means being formed to bring said certain and said remainder of said connecting means into the respective groups from closely spaced positions of tangency with said connector means lengths, said lengths on either side of said frame being free of carrier chain means for supporting same relative to said frame, whereby the permissible range of travel of the apparatus with said connector means attached thereto is twice the range of travel of said cart, and said cart is drawn along said trackway by movement of said apparatus without slippage of said connector means with respect to said end pulleys or slippage of the frame wheels with respect to said trackway.

2. The cart arrangement set forth in claim 1 wherein: the wheels of said frame are rollers that are separate from said end pulleys and from said support means rollers, whereby said wheels may be located relative to the plane of said frame to dispose said frame at any desired operating position relative to said trackway and the number of said wheels may be independent of the number of said support means rollers and the number of said end pulleys, said wheels having a diameter that is small as compared with the diameters of said end pulleys.

3. The cart arrangement set forth in claim 1 wherein the flexible elements making up said certain and said remainder connector means respectively are laced together in ribbon form at spaced points lengthwise thereof by discrete lacing devices to form a pair of banks of said connector means extending around either end of said frame.

4. The cart arrangement set forth in claim 3 wherein said lacing devices each comprise:

a length of relatively thin cordage doubled over adjacent of said flexible elements and having its spaced portions extend through eye members interposed between adjacent of said flexible elements, and including means for securing the ends of the cordage together.

5. The cart arrangement set forth in claim 1 wherein: said certain and said remainder connector means respectively include a cordage member each extending between said anchoring and parallel to the respective connector means portions, whereby the drawing action on said cart that is occasioned by movement of said apparatus is applied thereto through said cordage members.

6. The cart arrangement set forth in claim 1 wherein: said frame is horizontally disposed and is essentially open centered beneath said support means for self cleaning characteristics, and wherein said trackway beneath said frame is essentially open centered for self cleaning characteristics, with the area beneath said trackway being open for ready cleaning purposes.

7. The cart arrangement set forth in claim 1 wherein: said end pulleys each include a rim portion riding on said trackway to form the end wheels of said frame, said end pulley rim portions having radii equivalent in length to the radii of the neutral axis of said flexible connector means portion segments that are arced about said pulleys.

8. The cart arrangement set forth in claim 1 wherein: said end pulleys are contoured to dispose the neutral axes of said flexible connector means portion segments that are arced about said pulleys, respectively, in substantial alignment.

9. The cart arrangement set forth in claim 1 wherein: said end pulleys each comprise separate sheaves respectively training said connector means portions, whereby said connector means may be of different diameters and slippage thereof with respect to said pulleys is avoided.

10. A cart arrangement for supporting in an orderly manner flexible elements such as cables, hoses, and the like comprising flexible connector means that extend from a stationary source to a movable apparatus which includes mechanisms to be supplied by the cables and hoses or the like, said cart arrangement comprising:

a wheeled elongate frame riding on an elongate trackway that extends substantially parallel to the path of movement of the movable apparatus, a free wheeling end pulley journalled on said frame adjacent each end thereof, said pulleys being journalled for rotation about substantially parallel axes, means on the flexible element entry side of said frame for anchoring the flexible connector means in a group in a stationary position relative to the trackway and at approximately half way between the ends of the trackway, means on the flexible element exit side of said frame for anchoring the flexible connector means in a group to the apparatus, with the flexible connector means portions intermediate said anchoring means being trained in half loop form over said end pulleys, with certain of said connector means engaging one of the end pulleys and the remainder of said connector means engaging the other of said end pulleys, means for disposing the lengths of said connector means that extend between the respective anchoring means and end pulleys in substantial parallelism longitudinally of said frame, said anchoring means being formed to bring said certain and said remainder of said connecting means into the respective groups from closely spaced positions of tangency with said connector means lengths, whereby the permissible range of travel of the apparatus with said connector means attached thereto is twice the range of travel of said cart, and said cart is drawn along said trackway by movement of said apparatus without slippage of said connector means with respect to said end pulleys or slippage of the frame wheels with respect to said trackway, with the wheels of said frame being rollers that are separate from said end pulleys whereby the track wheels may have an r.p.m. independent of the r.p.m. of the end pulleys and said wheels may be located relative to the plane of said frame to dispose said frame at any desired operating position relative to said trackway and the number of said wheels may be independent of the number of said end pulleys.

11. The cart arrangement set forth in claim 10 wherein: said anchoring means of the flexible element exit side includes means for permitting same to float vertically of the apparatus.

12. The cart arrangement set forth in claim 10 wherein: said end pulleys each include end flanges that are adjustable axially of the respective end pulleys, said end flanges each comprising:

a split annular member encircling the pulley, means for drawing together the split portions of said annular member to clamp same to the end pulley, and guide means operably associated with said split portions' outside surfaces only to maintain them in alignment axially of the end pulley.

13. A cart arrangement for supporting in an orderly manner flexible elements such as cables, hoses, cordage and the like comprising flexible connector means that extend from a stationary source to a movable apparatus which includes mechanisms to be supplied by the cables and hoses or the like, said cart arrangement comprising:
  a wheeled elongate frame riding on an elongate trackway that extends substantially parallel to the path of movement of the movable apparatus,
  a free wheeling end pulley journaled on said frame adjacent each end thereof,
  said pulleys being journaled for rotation about substantially parallel axes,
  means on the flexible element entry side of said frame for anchoring the flexible connector means in a group in a stationary position relative to the trackway and at approximately half way between the ends of the trackway,
  means on the flexible element exit side of said frame for anchoring the flexible connector means in a group to the apparatus,
  with the flexible connector means portion intermediate said anchoring means being trained in half loop form over said end pulleys,
  with certain of said connector means engaging one of the end pulleys and the remainder of said connector means engaging the other of said end pulleys,
  said frame end pulleys being proportioned to dispose the lengths of said connector means that extend between the respective anchoring means and end pulleys in substantial parallelism longitudinally of of said frame,
  said frame including spaced apart support means intermediate said end pulleys along said exit side thereof that are positioned to support the connector means lengths in said substantial parallelism, with said support means comprising free wheeling rollers having a diameter that is small as compared with the diameters of said end pulleys,
  said connector means lengths on either side of said frame being free of carrier chain means for supporting same relative to said frame,
  whereby the permissible range of travel of the apparatus with said connector means attached thereto is twice the range of travel of said cart, and said cart is drawn along said trackway by movement of said apparatus.

14. The cart arrangement set forth in claim 13 wherein:
the wheels of said frame are rollers that are separate from said end pulleys and from said support means rollers,
whereby said wheels may have diameters and r.p.m.'s that are independent of the diameters and r.p.m.'s of said end pulleys and said support means rollers, permitting said cart to move without slippage of said connector means with respect to said end pulleys and without slippage of the frame wheels with respect to said trackway, and the number of said wheels employed may be significantly less than the number of said support means rollers,
and whereby said wheels may be located relative to the plane of said frame to dispose said frame at any desired operating position relative to said trackway, and the number of said wheels may be independent of, and significantly less than, the number of said support means rollers and the number of said end pulleys,
said wheels having a diameter that is small as compared with the diameters of said end pulleys.

15. A cart arrangement for supporting in an orderly manner flexible elements such as cables, hoses, cordage and the like comprising flexible connector means that extend from a stationary source to a movable apparatus which includes mechanisms to be supplied by the cables and hoses or the like, said cart arrangement comprising:
  a wheeled elongate frame riding on an elongate trackway that extends substantially parallel to the path of movement of the movable apparatus,
  a free wheeling end pulley journaled on said frame adjacent each end thereof,
  said pulleys being journaled for rotation about substantially parallel axes,
  means on the flexible element entry side of said frame for anchoring the flexible connector means in a group in a stationary position relative to the trackway and at approximately half way between the ends of the trackway,
  means on the flexible element exit side of said frame for anchoring the flexible connector means in a group to the apparatus,
  with the flexible connector means portions intermediate said anchoring means being trained in half loop form over said end pulleys,
  with certain of said connector means engaging one of the end pulleys and the remainder of said connector means engaging the other of said end pulleys,
  whereby the permissible range of travel of the apparatus with said connector means attached thereto is twice the range of travel of said cart,
  with the wheels of said frame being rollers that are separate from said end pulleys whereby the track wheels may have a r.p.m. independent of the r.p.m. of the end pulleys and whereby the track wheels may have a diameter that is independent of the diameter of the end pulleys, and said wheels may be located relative to the plane of said frame to dispose said frame at any desired operating position relative to said trackway and the number of said wheels may be independent of the number of said end pulleys, whereby said cart is drawn along said trackway by movement of said apparatus without slippage of said connector means with respect to said end pulleys or slippage of the frame wheels with respect to said trackway resulting from any diameters used for the wheels and end pulleys.

16. The cart arrangement set forth in claim 15 wherein:
said connector means include a cordage member extending between said anchoring means,
whereby the drawing action applied to said cordage member by movement of said apparatus is applied to said cart by said cordage member.

17. The cart arrangement set forth in claim 15 wherein:
said frame is horizontally disposed and is essentially open centered beneath said support means for self cleaning characteristics,
and wherein said trackway beneath said frame is essentially open centered for self cleaning characteristics, with the area beneath said trackway being open for ready cleaning purposes.

18. The cart arrangement set forth in claim 15 wherein:
said end pulleys each include a rim portion riding on said trackway to form the end wheels of said frame,
said end wheels comprising part of said frame wheels,
said end pulley rim portions having radii equivalent in length to the radii of the neutral axis of said flexible connector means portion segments that are arced about said pulleys.

19. The cart arrangement set forth in claim 15 wherein:
said frame includes spaced support means for said connector means intermediate said end pulleys along said exit side thereof,
with said support means comprising free wheeling rollers that are separate from said wheels of said frame,
whereby the diameters, location, number, and r.p.m.'s of the support means rollers and the frame wheels may be independent of each other,
with the upper peripheral portions of said support means rollers being tangent to a plane which is substantially parallel to the path of movement of the movable apparatus and to which plane at least one of said end pulleys has its upper peripheral surface tangent.

References Cited

UNITED STATES PATENTS 2,892,388 6/1959 Daugherty ........... 191—12

3,315,042 4/1967 Munck ........... 191—12

ARTHUR L. LA POINT, *Primary Examiner.*

D. E. WORTH III, *Assistant Examiner.*

U.S. Cl. X.R.

191—12, 45

PO-1050
(5/69)

UNITED STATES PATENT OFFICE
CERTIFICATE OF CORRECTION

Patent No. 3,446,159           Dated May 27, 1969

Inventor(s) William P. Lawson

It is certified that error appears in the above-identified patent and that said Letters Patent are hereby corrected as shown below:

Column 11, line 54, after "anchoring" insert -- means --.
Column 13, line 20, for "portion" read -- portions --;
same column 13, line 31, after "spaced" delete -- apart --.
Column 14, line 26, for "a" read -- an --.

SIGNED AND
SEALED
JUL 7 1970

(SEAL)
Attest:

Edward M. Fletcher, Jr.
Attesting Officer

WILLIAM E. SCHUYLER, JR.
Commissioner of Patents